(No Model.)

G. A. VAUGHAN.
ATTACHMENT TO STOVES FOR HEATING AIR.

No. 312,678. Patented Feb. 24, 1885.

Witnesses:
Wm. F. Rosenbaum
R. D. Goodell

Inventor:
George A. Vaughan
by J. S. Duffie
Attorney

UNITED STATES PATENT OFFICE.

GEORGE ALLEN VAUGHAN, OF LOCKESBURG, ARKANSAS.

ATTACHMENT TO STOVES FOR HEATING AIR.

SPECIFICATION forming part of Letters Patent No. 312,678, dated February 24, 1885.

Application filed March 11, 1884. (No model.)

*To all whom it may concern:*

Be it known that I, GEORGE ALLEN VAUGHAN, a citizen of the United States, residing at Lockesburg, in the county of Sevier and State of Arkansas, have invented certain new and useful Improvements in Attachments to Stoves for Heating Air; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improvements in stove-drums for heating air; and it consists in the novel construction and arrangement of its parts, hereinafter fully shown and described.

Figure 1:
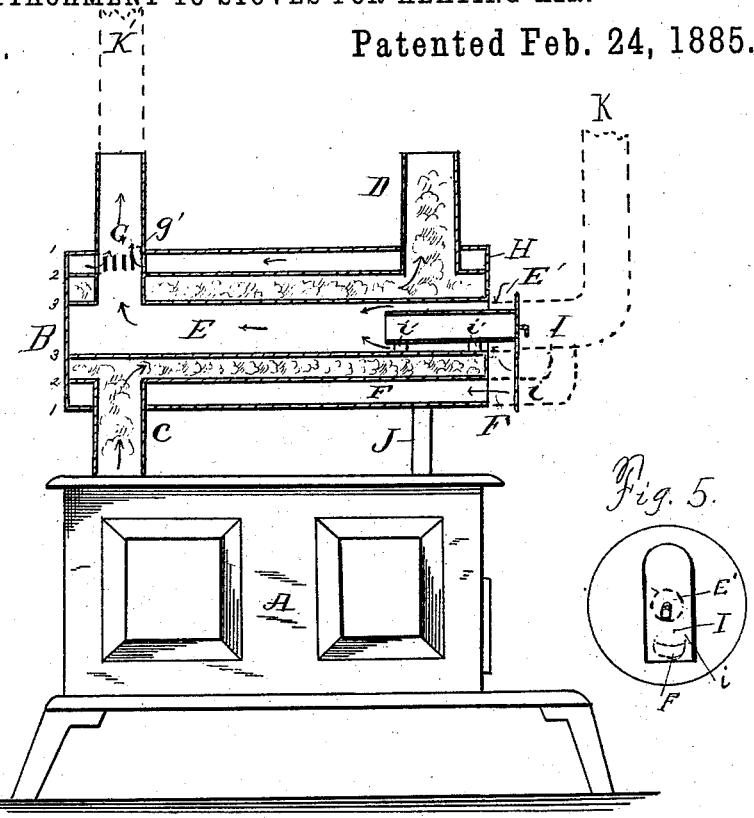
Figure 5:
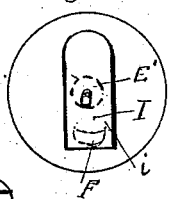
Figure 2:
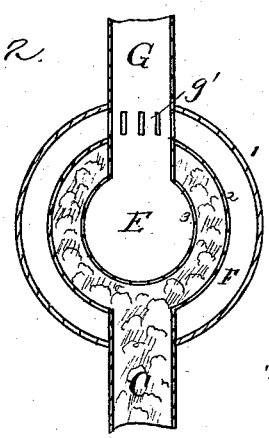
Figure 3:
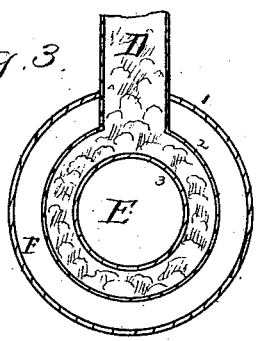
Figure 4:
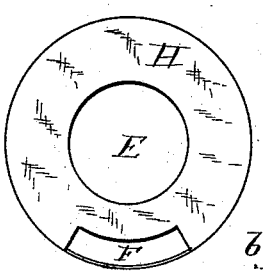

In the accompanying drawings, Figure 1 is a vertical longitudinal sectional view of my drum B and its attachments mounted on a heating-stove. Fig. 2 is a cross-section cut through the center of pipes C and G. Fig. 3 is a cross-section cut through at pipe D. Fig. 4 is a face view of the open end of the drum B, the other end being closed, and Fig. 5 is a view of the same, showing the damper or valve I in position.

The drum B is composed of three cylinders, numbered 1, 2, and 3. The cylinder 3 is open at its front end, E', but is closed at its rear end. Cylinder 2 is closed at both ends. Cylinder 1 has a small opening, F, at its front end and on its lower side, its rear end and the upper side of its front end being closed. Cylinder 2 is on the inside of cylinder 1, and 3 on the inside of 2. All the cylinders are equal in length, and secured together by a head, B', at their rear ends, and a head, H, at their front ends. This drum B when thus constructed, is mounted on a stove, A, and has for its rests pipe C and braces J. By a little change of rests and brace, it can be attached with equal benefits to any stove. The pipe C fits on pipe-head at the rear end of stove A, and passes unbroken through the lower side of cylinder 3, and terminates in and is secured to the lower side of cylinder 2 near its rear end. The heat and smoke pass through this pipe C into the space between 2 and 3, and out of pipe D, which is secured to the upper side of cylinder 2 near its front end, and passes unbroken through the upper side of cylinder 1 near its front end. Pipe G is secured to cylinder 3 near its rear end, and passes unbroken through the upper sides of cylinders 2 and 1; but it however has lateral slots $g'$ extending from cylinders 2 to 1 to allow the passage of the air from the space between cylinders 2 and 1. Cold air enters the cylinder 3 at its front end, E', and, passing to the rear, escapes through pipe G. Cold air also enters cylinder 1 at opening F, and, passing around cylinder 2 and to the rear, passes through slots $g'$ and out of pipe G. It will be seen that thus cold air passes on both sides of the hot-air chamber, and no part of the hot air is lost.

To regulate the amount of cold air which I wish to enter the drum, I provide a door or slide, I. This door or slide is made of a joint of stove-pipe, with a head, $i$, large enough to cover openings E' and F, so that when I shove it nearly up I can cut off nearly all the cold air, and when I shove it all the way up, I cut off all the cold air. It has legs $i'$ $i'$, upon which it rests to hold it in the center of cylinder 3, admitting the cold air to enter all around it. By this invention I constantly pass the cold air of a room through the heated drum and out of pipe G again and again, keeping it constantly warm.

By attaching a pipe (represented by the dotted lines K) to the openings F and E', I can draw pure air from outside of the room and deposit it in the room, and by a pipe (represented by the dotted lines K') attached to pipe G, I can send the heated air to any room in the house.

I am aware of the patent of Whittaker, No. 55,939, June 26, A. D. 1866, in which is described an upright drum, consisting of three concentric cylinders of unequal lengths, so connected with the stove and the outside air that the inner and outside spaces are supplied with air to be heated, and are in open connection with each other, while the intervening space serves for the passage of the heated gases and products of combustion, the heated gases and cold air both entering the lower end of the drum; but I do not claim such construction, my combination differing therefrom in the following respects: My drum is horizontal, and consists of three concentric cylinders, all of equal length, and all bound into one drum by two common heads. The heat enters my drum at one end while the cold air enters it at the other end. Thus the cold air is constantly meeting and passing on either side of a fresh current of hot air, which imparts a great quantity of heat to the cold air.

Having thus described my invention, what I claim as new, and desire to secure by Letters Patent, is—

1. In a heating-drum, the combination of cylinders 1 2 3, with head B, secured to each at its rear end and completely closing the end thereof, head H, secured to each at its front end, closing the end of cylinder 2 and partly closing the front end of cylinder 1, heat-pipe C, passing up through cylinder 1 near its rear end, and terminating in cylinder 2, pipe D, connected to cylinder 2 on its upper side, near its front end, and passing up through cylinder 1, and pipe G, having slots G', said pipe being connected to the upper side of cylinder 3, and passing up through cylinders 2 and 1, all as substantially shown and described, and for the purposes set forth.

2. In a compound drum for heating air, as above described, door or slide I, having head $i$, large enough to cover and close openings E' and F, and feet $i'$ $i'$, to hold it in the center of cylinder 3, substantially as shown and described.

3. In a heating-drum, the combination of cylinders 1 2 3, with head B, secured to each at its rear end, and completely closing the end thereof, head H, secured to each at its front end, closing the end of cylinder 2 and partly closing the front end of cylinder 1, heat-pipe C, passing up through cylinder 1 near its rear end, and terminating in cylinder 2, pipe D, connected to cylinder 2 on its upper side near its front end, and passing up through cylinder 1, pipe G, having slots G', said pipe being connected to the upper side of cylinder 3, and passing up through cylinders 2 and 1, and door or slide I, having head $i$, large enough to cover and close openings E' and F, and feet $i'$ $i'$, all substantially as shown and described, and for the purposes set forth.

In testimony whereof I affix my signature in presence of two witnesses.

GEORGE ALLEN VAUGHAN.

Witnesses:
A. C. STEEL,
W. W. MORRIS.